United States Patent [19]

Meier et al.

[11] 4,151,746

[45] May 1, 1979

[54] CYANOETHYLATED COMPOSITION FOR FORMING THERMOPARTICULATING COATING

[75] Inventors: Joseph F. Meier, Export; James D. B. Smith, Wilkins Township, Allegheny County; David C. Phillips, Penn Hills, all of Pa.

[73] Assignee: Westinghouse Electric Corp., Pittsburgh, Pa.

[21] Appl. No.: 702,257

[22] Filed: Jul. 2, 1976

[51] Int. Cl.$^2$ ............... G01K 3/00; G01K 11/00; C09K 3/00; C08K 5/16; C08L 63/00

[52] U.S. Cl. .................... 73/339 R; 252/408; 260/31.4 EP; 260/32.4; 260/33.2 EP; 260/37 EP

[58] Field of Search .....252/408; 73/339 R, DIG. 339, TP, 73/344, 349, 28; 260/32.4, 37 EP, 31.8 E, 31.4 EP, 33.2 EP; 310/52, 55, 56

[56] References Cited

U.S. PATENT DOCUMENTS

| | | | |
|---|---|---|---|
| 3,427,880 | 2/1969 | Grobel et al. | 252/408 |
| 3,955,417 | 5/1976 | Smith et al. | 252/408 |
| 3,957,014 | 5/1976 | Phillips et al. | 116/114 V |
| 3,973,438 | 8/1976 | Smith et al. | 252/408 |
| 3,973,439 | 8/1976 | Smith et al. | 252/408 |

OTHER PUBLICATIONS

Adams, R., et al., Editor, "Organic Reactions," vol. V, (Chapt. 2, Bruson, H. A., John Wiley & Sons, Inc., N. Y., pp. 79-135, (1949).

Whitmore, F. C., et al., J. Chem. Soc., vol. 66, pp. 725-731, (1944).

Schwartz, A. M., et al., "Surface Active Agents and Detergents, Interscience Publishers, Inc.," N. Y., p. 106, (1958).

*Primary Examiner*—Benjamin R. Padgett
*Assistant Examiner*—T. S. Gron
*Attorney, Agent, or Firm*—R. D. Fuerle

[57] ABSTRACT

A composition is disclosed of a cyanoethylated compound, a resinous carrier, and a solvent. The composition is applied to a portion of an electrical apparatus which is exposed to a gas stream. The solvent in the composition is evaporated to produce a thermoparticulating coating. When the electrical apparatus overheats, the cyanoethylated compound in the coating forms particles in the gas stream which are detected by a monitor.

16 Claims, No Drawings

CYANOETHYLATED COMPOSITION FOR FORMING THERMOPARTICULATING COATING

CROSS REFERENCES TO RELATED APPLICATION

This application is related to application Ser. No. 426,391, filed Dec. 19, 1973 by Emil M. Fort, Thomas D. Kaczmarek, and David Colin Phillips titled "Sampling System for Power Generators," now U.S. Pat. No. 3,972,225.

This application is related to application Ser. No. 390,284, filed Aug. 21, 1973 by J. D. B. Smith and D. C. Phillips titled "Composition for Thermo-particulating Coating, Which Protects Electrical Apparatus," now U.S. Pat. No. 3,973,438.

This application is related to application Ser. No. 568,219, filed Apr. 15, 1975 by J. D. B. Smith and D. C. Phillips titled "Malonic Acid Derivative Composition for Forming Thermoparticulating Coating," now U.S. Pat. No. 3,995,489.

This application is related to application Ser. No. 568,224, filed Apr. 15, 1975 by J. D. B. Smith and D. C. Phillips titled "Diazonium Salt Composition for Forming Thermoparticulating Coating," now U.S. Pat. No. 3,979,353.

This application is also related to application Ser. No. 568,222, filed Apr. 15, 1975 by J. D. B. Smith, J. F. Meier, and D. C. Phillips titled "Block Isocyanate Composition for Forming Thermoparticulating Coating," now U.S. Pat. No. 4,056,005.

This application is related to application Ser. No. 568,223, filed Apr. 15, 1975 by J. D. B. Smith, D. C. Phillips, and K. W. Grossett titled "Grease Thermoparticulating Coating," now U.S. Pat. No. 3,955,417.

This application is related to application Ser. No. 634,217, filed Nov. 21, 1975 by J. D. B. Smith et al. titled "Metal Dithiocarbamate Composition for Forming Thermoparticulating Coating," now U.S. Pat. No. 4,056,006.

PRIOR ART

See "Organic Reactions," edited by Roger Adams, Volume 5, Chapter 2 by H. A. Bruson, pages 79 to 135 (1949).

BACKGROUND OF THE INVENTION

Electrical apparatus, such as motors and turbine generators, occasionally overheat due to shorts or other malfunctions. The longer the overheating continues the more damage is done to the apparatus. A malfunction detected immediately may mean only a quick repair but if the overheating continues, the entire machine may be damaged.

Large rotating electrical apparatus is usually cooled with a hydrogen gas stream. The organic compounds in the apparatus are first to be affected by the overheating and they decompose to form particles which enter the gas stream. Monitors then detect particles in the gas stream and sound a warning or shut down the apparatus when too many particles are detected.

As the cross-referenced related applications disclose, special coatings may be applied to the apparatus which decompose and form detectable particles at a lower temperature than the usual organic compounds found in the apparatus.

Efforts to identify materials which will decompose to form detectable particles (i.e., thermoparticulate) at temperatures closer to the operating temperature of the machine have met with several difficulties. Many compounds, such as succinic acid, maleic acid, fumaric acid, and polyacrylic acid, do not decompose below 190° C. Others, such as acetic acid, are liquids which boil and therefore are unsuitable. Some compounds, such as oxalic acid and ketomalonic acid monohydrate decompose at a low temperature but the decomposition products do not include detectable particles. Compounds such as 1,2-diformylhydrazine have some of the desirable properties but cannot withstand several years operation at 50 to 100° C. A few compounds contain toxic or corrosive substances in their decomposition products which may render them unsuitable.

SUMMARY OF THE INVENTION

We have found that certain cyanoethylated compounds can be used in a composition to form a coating which thermoparticulates. The coating can be made compatible with the other organic compounds in the apparatus. The coating is very stable and can withstand several years operation at 60° C. without decomposing, yet still produce detectable particles when the temperature reaches about 160 to 200° C. (depending on the particular thermoparticulating compound used). Also, when the coating is heated to about the thermoparticulating temperature of the coating it blisters and becomes a very dark brown color which is a considerable aid in locating the malfunction.

The thermoparticulating compounds of this invention are also capable of being "tailor-made" to produce desired or unique signals, because they are the reaction products of a nitrile compound and a compound having an active hydrogen. The thermoparticulating compound decomposes into the nitrile compound and the active hydrogen compound on heating and unique or easily-identified groups on either of these compounds will enter the gas stream. The compounds of this invention also give very strong signals when they thermoparticulate, which makes them very sensitive to overheating. Also, they are inexpensive and easily synthesized.

DESCRIPTION OF THE INVENTION

A composition is prepared of a cyanoethylated compound in a solution of a resinous carrier. The cyanoethylated compound may be dispersed if it is insoluble in the solvent (e.g., toluene) or it may be in solution if it is soluble in the solvent (e.g., ethyl alcohol or diethyl ether). Dispersions are preferred as they produce much more particulation than do solutions. A particle size of the dispersed cyanoethylated compound of about 25 to about 1000 microns is suitable.

The composition may be prepared by simply mixing the ingredients, but it is preferable to mix the drier, resinous carrier, and solvent first and then add the cyanoethylated compound to prevent the occlusion of the drier in the cyanoethylated compound and thereby obtain a more homogeneous dispersion.

A suitable composition is a resinous carrier, about 20 to about 250 phr (parts by weight per hundred parts of resinous carrier) of a cyanoethylated compound, and about 25 to about 75% (by weight based on the resinous carrier) of a solvent for the resinous carrier. If the amount of cyanoethylated compound is less than about 20 phr, the quantity of particles given off during decomposition may be too low to be detected by presently-existing detectors. However, the construction of more sensitive detectors would permit a lower amount of cyanoethylated compound. If the amount of cyanoethylated compound exceeds about 250 phr, the composition is thick, difficult to apply, and does not bond well. The preferred amount of cyanoethylated compound, which generally gives the best results, is about 40 to about 60 phr. If the amount of solvent is less than about 25% (by weight based on the resinous carrier), the composition is generally too viscous to apply easily and if the amount of solvent is greater than about 75%, the composition is unnecessarily dilute and the coating may be too thin to produce an adequate number of particles during decomposition, at least while the malfunction is highly localized. Best results are usually obtained with about 45 to about 55% solvent.

The composition also preferably contains about 0.1 to about 3 phr of a drier when the resinous carrier is an epoxy resin or similar resin, to promote its room temperature cure. Lead naphthenate or cobalt naphthenate is preferred although stannous octoate, zinc stearate, etc., could also be used. Resins such as polyesters may also require the presence of an organic peroxide as is known in the art. Mixtures of various resins, solvents, or driers are also contemplated.

The thermoparticulating compounds of this invention are addition reaction products of a compound having an active hydrogen ($R_1H$) and a nitrile compound having the general formula

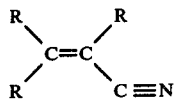

according to the equation $R_1H + CR_2 = CR—C\equiv N \rightarrow R_1CR_2 —CHR—C\equiv N$. In the formula each R is independently selected from hydrogen, halide, alkyl to $C_8$, nitro, cyano, aryl, alkylaryl, arylalkyl, aliphatic, cyclo-aliphatic, heterocyclic, or mixtures thereof. Preferably, the nitrile compound has the general formula $CH_2 = CR — C\equiv N$, where R is as previously defined. The preferred nitrile compounds are acrylonitrile, methacrylonitrile, α-chloroacrylonitrile, or mixtures thereof, because they give low thermoparticulating temperatures.

Suitable compounds having active hydrogens include amines, imides, lactams, alcohols, phenols, oximes, mercaptans, thiophenols, sulfones, haloforms, ketones, aldehydes, nitriles, and mixtures thereof. Preferred active hydrogen compounds include phenols, alcohols, amines, thiophenols, mercaptans, oximes, and mixtures thereof because these compounds give addition compounds which thermoparticulate at lower temperatures. For the same reason, β-naphthol and carbazole are preferred.

An extremely long list of cyanoethylated compounds can be found in the previously-cited prior art reference.

The resinous carrier performs the function of bonding the cyanoethylated compound to the apparatus since a coating of cyanoethylated compound by itself does not adhere well. The resinous carrier should be compatible with the other resins used in the apparatus and therefore it is usually advantageous to use the same resin used elsewhere. The resinous carrier is curable at room temperature and is preferably air-dryable since it cannot be easily cured in place with heat. Also, it should be stable after curing for several years at 60° C. The resin must be unreactive with the cyanoethylated compound for otherwise suitable thermoparticulation may not occur. The cyanoethylated compound and the resin form a mixture and the cyanoethylated compound does not catalyze the cure of the resin. Epoxy resins are preferred as they are usually used elsewhere in the apparatus, but polyesters, silicone rubber, styrene, acrylics, urethanes, etc., could also be used.

The solvent for the resinous carrier depends on the particular resinous carrier used. Toluene, xylene, benzene, methyl ethyl ketone, ethyl alcohol, diethyl ether, acetone, cellosolve, etc., are common solvents that may be used. Toluene is preferred as it is inexpensive and dissolves most resins. A reactive diluent such as butyl glycidyl ether may also be used as a solvent with some resins. The solvent may be omitted if a suitable liquid non-dryable resin can be found, though none are known at the present time.

The composition is applied to portions of the electrical apparatus which are exposed to the gas stream. The coating does not function as insulation and is usually applied on top of insulation, but it can also be applied to conductors. The application may be made by painting, spraying, dipping, grease gun, or other techniques. A suitable coating thickness (after drying) is about 1/16 to about ½ inch. The dispersed particles of cyanoethylated compound should not be covered with excessive resinous carrier as that may prevent the decomposition particles from escaping into the gas stream. After evaporation of the solvent and room temperature cure of the resinous carrier, if necessary, the apparatus is ready to be operated. When the thermoparticulation and the resulting alarm occur, a sample of the gas stream can be collected and analyzed. Since different thermoparticulating compounds can be used in different areas of the apparatus and their thermoparticulation products are different, analysis of the sample can pinpoint the location of the overheating.

The following example further illustrates this invention:

EXAMPLE

Three cyanoethylated compounds have been prepared. These were
 (a) β-Naphthol-acrylonitrile [1-(2-cyanoethyl)-2-hydroxynaphthalene.]
 (b) Carbazole-acrylonitrile [9-(β-cyanoethyl) carbazole.] and
 (c) Acetone-acrylonitrile [1,1,1-tris(2-cyanoethyl)-acetone.]

(a) β-Naphthol and Acrylonitrile: A mixture of 55 ml benzene, 29 g (0.2 mole) of β-naphthol, 9 g of sodium hydroxide pellets, and 12 g (0.22 mole) of acrylonitrile was heated under reflux for 2 hours. 100 ml of cold $H_2O$ was added and the mixture stirred until all the NaOH had dissolved. The aqueous layer was separated and acidified with acetic acid to yield the product which was subsequently recrystallized from ethanol. (Literature m.p. 141°–142° C., actual m.p. 134°–139° C.).

(b) Carbazole and Acrylonitrile: A mixture of carbazole (167 g; 1.0 mole) and acrylonitrile (250 ml; 3.8 mole) was cooled in an ice bath, and 2 ml of a 40% solution of benzyl-trimethylammonium hydroxide (sold by Eastman Kodak Co. under the trademark "Triton B") was added with vigorous stirring. Upon addition of the catalyst, the mixture became exothermic and a pasty mass began to precipitate out of solution. The mixture was then heated at ~ 100° C. for one hour and on cooling, crystals of the product began to form. (Literature m.p. 155°–156° C., actual m.p. 149°–152° C.).

(c) Acetone and Acrylonitrile: A stirred solution of acetone (29 g; 0.5 mole), t-butyl alcohol (30 g), and 30% ethanolic KOH (2.5 g) was cooled to 0°–5° C., a solution of acrylonitrile (80 g; 1.5 mole) and t-butyl alcohol (37 g) was added dropwise during the course of 1½ hours with the reaction temperature maintained at 0°–5° C. The reaction mixture was then stirred for 2 hours at 5° C. and the crystalline reaction product collected by filtration. The product was purified by crystallization from hot water (Literature m.p. 153°–154° C., actual m.p. 153°–155° C.).

The following composition was prepared using the three cyanoethylated compounds:

|  | Parts by Weight |
|---|---|
| Cyanoethylated compound | 100 |
| Epoxy resin 50% solids in toluene made from 200 pbw (parts by weight) linseed fatty acids, 200 pbw styrene, and 300 pbw diglycidyl ether of Bisphenol A, sold by Westinghouse Electric Corporation at "B-276" Varnish (See Example I of U.S. Pat. No. 2,909,497 for detailed description) | 100 |
| 6% solution in low boiling hydrocarbons of cobalt naphthenate | 1.0 |
| 24% solution in low boiling hydrocarbons of lead naphthenate | 0.25 |

The cobalt and lead naphthenate solutions were added to epoxy resin prior to the addition of the cyanoethylated compound.

Samples were prepared by brushing the above composition onto 3-inch by 1-inch aluminum and copper sheets 1/16 to ¼ inch thick. The samples were dried to form coatings about ¼ inch thick, then placed in an oven at 60, 80, and 100° C. for various periods to determine if they were stable and would function after aging.

The samples were placed one at a time in a stainless steel boat within a 1-inch stainless steel tube. Hydrogen was passed over the samples at a flow rate of 7 l/min. A phase-controlled temperature regulator and programmer controlled the temperature in the boat and the temperature in the boat was measured by mounting a hot junction chromel-alumel thermocouple within a small hole in the boat. The output of the thermocouple and the detector were monitored on a two-pen potentiostatic recorder. A 6° C./min. heating rate was maintained in each experiment after the insertion of the sample in the boat. The threshold temperature at which considerable particulation occurred was taken from the chart produced by the recorder. The occurrence of particulation was detected by using a Generator Condition Monitor or a Condensation Nuclei Monitor. Both instruments are sold by Environment One Corporation.

The following table gives the results.

| Cyanoethylated Compound | Aging Condition | Organoparticulation Temperature Range, °C. |
|---|---|---|
| β-naphthol + acrylonitrile | 3 days at 60° C. | 176–183 |
|  | 6½ mo. at 60° C. | 163–176 |
|  | 2 mo. at 80° C. | 179–186 |
|  | 2½ mo. at 100° C. in N₂ | >190 |
| Carbazole + Acrylonitrile | 3 days at 60° C. | 185–191 |
|  | 6¼ mo. at 60° C. | 171–178 |
|  | 2 mo. at 80° C. | 179–185 |
|  | 4½ mo. at 100° C. (air) | 187–192 |
| Acetone + Acrylonitrile | 3 days at 60° C. | >190 |

The first number in the organoparticulation range is the temperature of the sample when the alarm sounded on the ion chamber monitor. The second number in the organoparticulation range is the temperature of the sample when the current in the ion chamber had dropped to about half its normal value (i.e., from about 0.8mA to about 0.4mA).

What We claim is:

1. A composition comprising:
    (1) a thermoparticulating compound consisting of the addition reaction product of a compound having an active hydrogen and a nitrile compound selected from the group consisting of acrylonitrile, methacrylonitrile, α-chloracrylonitrile, and mixtures thereof; and
    (2) a solution of an epoxy resinous carrier air-dryable at room temperature, stable at 60° C. when dried, and unreactive with said thermoparticulating compound.

2. A composition according to claim 1 wherein said compound having an active hydrogen is selected from the group consisting of amines, imides, lactams, alcohols, phenols, oximes, mercaptans, thiophenols, sulfones, haloforms, ketones, aldehydes, nitriles, and mixtures thereof.

3. A composition according to claim 2 wherein said compound having an active hydrogen is selected from the group consisting of phenols, alcohols, amines, thiophenols, mercaptans, oximes, and mixtures thereof.

4. A composition according to claim 3 wherein said compound having an active hydrogen is β-naphthol or carbazole.

5. A composition according to claim 1 wherein the amount of said thermoparticulating compound is about 20 to about 250 phr and the amount of the solvent in said solution is about 25 to about 75% (by weight based on said resinous carrier).

6. A composition according to claim 5 wherein the amount of said thermoparticulating compound is about 40 to about 60 phr and the amount of said solvent is about 45 to about 55% (by weight based on said resinous carrier).

7. A composition according to claim 1 which includes about 0.1 to about 3 phr of a drier for said epoxy resin.

8. A composition according to claim 7 which is prepared by first mixing said solution of resinous carrier and said drier and then mixing in said thermoparticulating compound.

9. A composition according to claim 1 where the solvent in said solution is toluene.

10. A composition according to claim 1 wherein said thermoparticulating compound is dispersed in said solution.

11. A method of protecting electrical apparatus from change due to overheating and for thereafter determining the location of said overheating, said apparatus including a gas stream and a monitor for detecting particles in said gas stream and for emitting a signal when said particles are detected comprising:
    (A) preparing a composition according to Claim 1;

(B) applying said composition to said electrical apparatus at positions exposed to said gas stream;
(C) evaporating the solvent in said composition; and
(D) monitoring said gas stream for the presence of thermoparticulated particles therein.

12. A method according to claim 11 including the additional last step of inspecting said applied composition visually for blistered and darkened areas, after a signal has been emitted, to locate the area of overheating.

13. A method according to claim 11 including the additional last steps of collecting a sample of said gas stream after a signal has been emitted, and analyzing said sample.

14. A thermoparticulating coating comprising a solid layer of a room temperature air-dried epoxy resinous carrier containing an unreacted thermoparticulating compound consisting of the addition reaction product of a compound having an active hydrogren and a nitrile compound selected from the group consisting of acrylonitrile, methacrylonitrile, α-chloracrylonitrile, and mixtures thereof.

15. A coating according to claim 14 which is about 1/16 to about ½ inch thick.

16. A thermal detection system for electrical apparatus cooled by a gas stream, comprising a coating according to claim 14 on a portion of said electrical apparatus exposed to said gas stream and a monitor for detecting the presence of thermoparticulated particles in said gas stream.

* * * * *